(12) United States Patent
Wake

(10) Patent No.: US 8,424,008 B2
(45) Date of Patent: Apr. 16, 2013

(54) APPLICATION MANAGEMENT SUPPORT FOR ACQUIRING INFORMATION OF APPLICATION PROGRAMS AND ASSOCIATED LOGICAL VOLUME UPDATES AND DISPLAYING THE ACQUIRED INFORMATION ON A DISPLAYED TIME AXIS

(75) Inventor: Hiroshi Wake, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1253 days.

(21) Appl. No.: 12/014,943

(22) Filed: Jan. 16, 2008

(65) Prior Publication Data

US 2008/0250417 A1 Oct. 9, 2008

(30) Foreign Application Priority Data

Apr. 4, 2007 (JP) ................. 2007-098052

(51) Int. Cl.
  *G06F 11/00* (2006.01)
  *G06F 17/00* (2006.01)
  *G06F 13/00* (2006.01)
  *G06F 1/00* (2006.01)
  *G06F 9/46* (2006.01)

(52) U.S. Cl.
  USPC .............. 718/104; 714/19; 714/13; 714/2; 714/4; 714/1; 707/695; 707/204; 711/162; 711/165; 711/170; 711/114; 713/324

(58) Field of Classification Search .......... 714/19, 714/13, 2, 4.1; 707/695, 204; 711/162, 165, 711/114, 170; 713/324; 718/104
  See application file for complete search history.

(56) References Cited

U.S. PATENT DOCUMENTS

| | | | |
|---|---|---|---|
| 7,111,136 B2 | 9/2006 | Yamagami | |
| 7,143,413 B2* | 11/2006 | McCarthy et al. | 718/104 |
| 7,162,601 B2 | 1/2007 | Yamagami | |
| 7,263,590 B1* | 8/2007 | Todd et al. | 711/165 |
| 7,383,465 B1* | 6/2008 | van Rietschote et al. | 714/13 |
| 7,398,422 B2* | 7/2008 | Amano et al. | 714/19 |
| 7,401,248 B2* | 7/2008 | Nakahara et al. | 714/4.1 |
| 7,469,358 B2* | 12/2008 | Kaiya et al. | 714/2 |
| 7,475,206 B2* | 1/2009 | Murotani et al. | 711/162 |
| 7,660,958 B2* | 2/2010 | Shackelford et al. | 711/162 |
| 7,681,001 B2* | 3/2010 | Maruyama et al. | 711/165 |
| 7,725,445 B2* | 5/2010 | Hirakawa et al. | 707/695 |
| 8,086,808 B2* | 12/2011 | Ichikawa | 711/162 |
| 2001/0054133 A1* | 12/2001 | Murotani et al. | 711/114 |

(Continued)

FOREIGN PATENT DOCUMENTS

JP 2005-018738 1/2005

*Primary Examiner* — Thomas Lee
*Assistant Examiner* — Aurel Prifti
(74) *Attorney, Agent, or Firm* — Antonelli, Terry, Stout & Kraus, LLP.

(57) ABSTRACT

A first information resource denoting which logical volume is allocated to which application program is prepared in a management computer. The management computer either regularly or irregularly acquires from the storage system information as to which logical volumes were updated at what times, registers the acquired information in a second information, references the first and second information, acquires update management information, which is information denoting which logical volume is updated at what time, and the application program to which this logical volume is allocated, and sends this update management information to a host computer. The host computer, based on the update management information from the management computer, displays which logical volume has been updated at what time, and which application program is allocated to this logical volume.

17 Claims, 14 Drawing Sheets

U.S. PATENT DOCUMENTS

| | | | |
|---|---|---|---|
| 2006/0195493 A1* | 8/2006 | Chang et al. | 707/204 |
| 2007/0050545 A1* | 3/2007 | Tsuboki et al. | 711/114 |
| 2007/0271475 A1* | 11/2007 | Hatasaki et al. | 713/324 |
| 2007/0277011 A1* | 11/2007 | Tanaka et al. | 711/162 |
| 2008/0082777 A1* | 4/2008 | Sakaguchi et al. | 711/170 |
| 2008/0120352 A1* | 5/2008 | Nishi et al. | 707/204 |

* cited by examiner

180 JVOL
(JVOL1)

| VOL IDENTIFIER | UPDATE LOCATION | UPDATE TIME | SEQ# | POINTER | |
|---|---|---|---|---|---|
| VOLUME 1 | 2001 | 2005:12:24:18:00:00:01 | 1 | #1 | |
| VOLUME 3 | 1203 | 2005:12:24:18:00:05:02 | 2 | #2 | } 401 |
| ⋮ | ⋮ | ⋮ | ⋮ | ⋮ | |
| #1 | DATA | | | | |
| #2 | DATA | | | | } 403 |
| ⋮ | | | | | |

115 AP REGISTRATION TABLE
(AP REGISTRATION TABLE 1)

| MANAGEMENT AP NAME | POINTER |
|---|---|
| AP1 | xxxx |
| AP2 | yyyy |
| AP3 | zzzz |

2006/12/02/22  04:03:22 × × JOB START
⋮
2006/12/05/22  05:01:24 × × JOB END

FIG. 4

133 AP MANAGEMENT TABLE

| VOLUME 1 | VOLUME 2 | VOLUME 3 | VOLUME 4 | VOLUME 5 | VOLUME 6 |
|---|---|---|---|---|---|
| AP1(host1) | AP3(host1) | AP4(host2) | AP5(host2) | AP1(host1) | AP5(host2) |
| AP2(host1) | AP2(host1) | AP5(host2) | | AP2(host1) | |
| | | AP1(host1) | | | |

FIG. 5

161 DVOL MANAGEMENT TABLE

| VOLUME 1 | VOLUME 2 | VOLUME 3 | VOLUME 4 | VOLUME 5 | VOLUME 6 |
|---|---|---|---|---|---|
| STORAGE 1 | STORAGE 1 | STORAGE 1 | STORAGE 1 | STORAGE 2 | STORAGE 2 |

137 DATA UPDATE HISTORY TABLE

| Time | VOLUME 1 | VOLUME 2 | VOLUME 3 | VOLUME 4 | VOLUME 5 | VOLUME 6 |
|---|---|---|---|---|---|---|
| 19:00:00 | Diff1_1 |  | Diff3_1 |  | Diff5_1 | Diff6_1 |
| 19:00:01 | Diff1_2 | Diff2_1 | Diff3_2 |  |  |  |
| 19:00:02 |  | Diff2_2 | Diff3_3 |  |  |  |
| 19:00:03 |  | Diff2_3 | Diff3_4 |  |  |  |
| 19:00:04 |  | Diff2_4 | Diff3_5 | Diff4_1 |  |  |

161' DVOL MANAGEMENT TABLE

| VOLUME 1 | VOLUME 2 | VOLUME 3 | VOLUME 4 | VOLUME 5 | VOLUME 6 |
|---|---|---|---|---|---|
| STORAGE 1 | STORAGE 1 | STORAGE 1 | STORAGE 1 | STORAGE 2 | STORAGE 2 |
| GROUP 3 | GROUP 1 | GROUP 1 | GROUP 1 | GROUP 2 | GROUP 3 |

FIG. 18

| Time | VOLUME 1 (AP1,AP2) | VOLUME 2 (AP2,AP3) | VOLUME 3 (AP1) | VOLUME 5 (AP1,AP2) | AP1 | AP2 | AP3 |
|---|---|---|---|---|---|---|---|
| 19:00:00 | ▓ |  | ▓ | ▓ | ▓ | ▓ |  |
| 19:00:01 | ▓ | ▓ | ▓ |  | ▓ | ▓ |  |
| 19:00:02 |  | ▓ | ▓ |  | ▓ | ▓ |  |
| 19:00:03 |  | ▓ | ▓ |  |  |  | ▓ |
| 19:00:04 |  | ▓ | ▓ |  |  | ▓ | ▓ |

APPLICATION MANAGEMENT SUPPORT FOR ACQUIRING INFORMATION OF APPLICATION PROGRAMS AND ASSOCIATED LOGICAL VOLUME UPDATES AND DISPLAYING THE ACQUIRED INFORMATION ON A DISPLAYED TIME AXIS

CROSS-REFERENCE TO PRIOR APPLICATION

This application relates to and claims the benefit of priority from Japanese Patent Application number 2007-98052, filed on Apr. 4, 2007, the entire disclosure of which is incorporated herein by reference.

BACKGROUND

The present invention relates to a computer system comprising a computer which executes an application program.

Technology called CDP (Continuous Data Protection) is known. CDP-related technology, for example, is disclosed in Japanese Patent Laid-open No. 2005-18738. According to this Japanese Patent Laid-open No. 2005-18738, a journal is created and stored each time a storage system receives a write request from a host computer and writes data to a logical volume, and when a restore is performed, a journal is used to restore data from an arbitrary time to a logical volume.

For example, there is a computer system, which comprises a storage system comprising a plurality of logical volumes; a computer (hereinafter, job host) for executing one or more job application programs (hereinafter, job AP) using the plurality of logical volumes; and a computer (hereinafter, storage management host) for managing the plurality of logical volumes. In an environment in which this computer system is operated, there may be an administrator (hereinafter, storage administrator), who uses the storage management host to manage the plurality of logical volumes, and an administrator (hereinafter, AP administrator), who manages a job AP, which is being executed by the job host.

In this computer system, the storage management host can send to a storage system a restore indication, which specifies the storage administrator's arbitrary RPO (Recovery Point Objective) time, in accordance with an operation by the storage administrator. In this case, the storage system, in response to this restore indication, can restore data of the specified RPO time to a logical volume.

Here, for example, when a failure occurs in the storage system while a job is being performed, and the storage administrator restores data in the storage system up to an arbitrary RPO time, the AP administrator does not know what data was restored. Further, the AP administrator also does not know if the restored data affects an AP, which he is managing. When these points need to be specified, the AP administrator must query the storage administrator.

Further, for example, the RPO time does not necessarily have to be an arbitrary time of the storage administrator, but can also be an arbitrary time decided by the AP administrator. However, the AP administrator is not aware of the utilization status of a logical volume by a job AP other than the job AP that he himself is managing. For example, there are times when a logical volume being used by an AP administrator-managed AP is also being used by a job AP other than the job AP that the AP administrator is managing himself. Thus, it is difficult for the AP administrator to decide an RPO time.

The above-mentioned problems can also exist when an AP is not a job AP.

SUMMARY

Therefore, an object of the present invention is to support the administrator of an application program that utilizes restored data.

Other objects of the present invention should become clear from the following description.

A first information resource denoting which logical volume is allocated to which application program is prepared by a management computer. The management computer either regularly or irregularly acquires from the storage system information as to which logical volumes were updated at what times, registers the acquired information in a second information resource, references the first and second information resources, acquires update management information, which is information denoting which logical volume is updated at what time, and the application program to which this logical volume is allocated, and sends this update management information to a host computer. The host computer, based on the update management information from the management computer, displays which logical volume is updated at what time, and which application program is allocated to this logical volume.

BRIEF DESCRIPTION OF THE DRAWINGS

FIG. 4 shows an example of the configuration of an AP management table;

FIG. 5 shows an example of the configuration of a DVOL management table;

FIG. 18 shows a variation of the AP management support GUI.

DETAILED DESCRIPTION OF THE PREFERRED EMBODIMENTS

Figure 1:
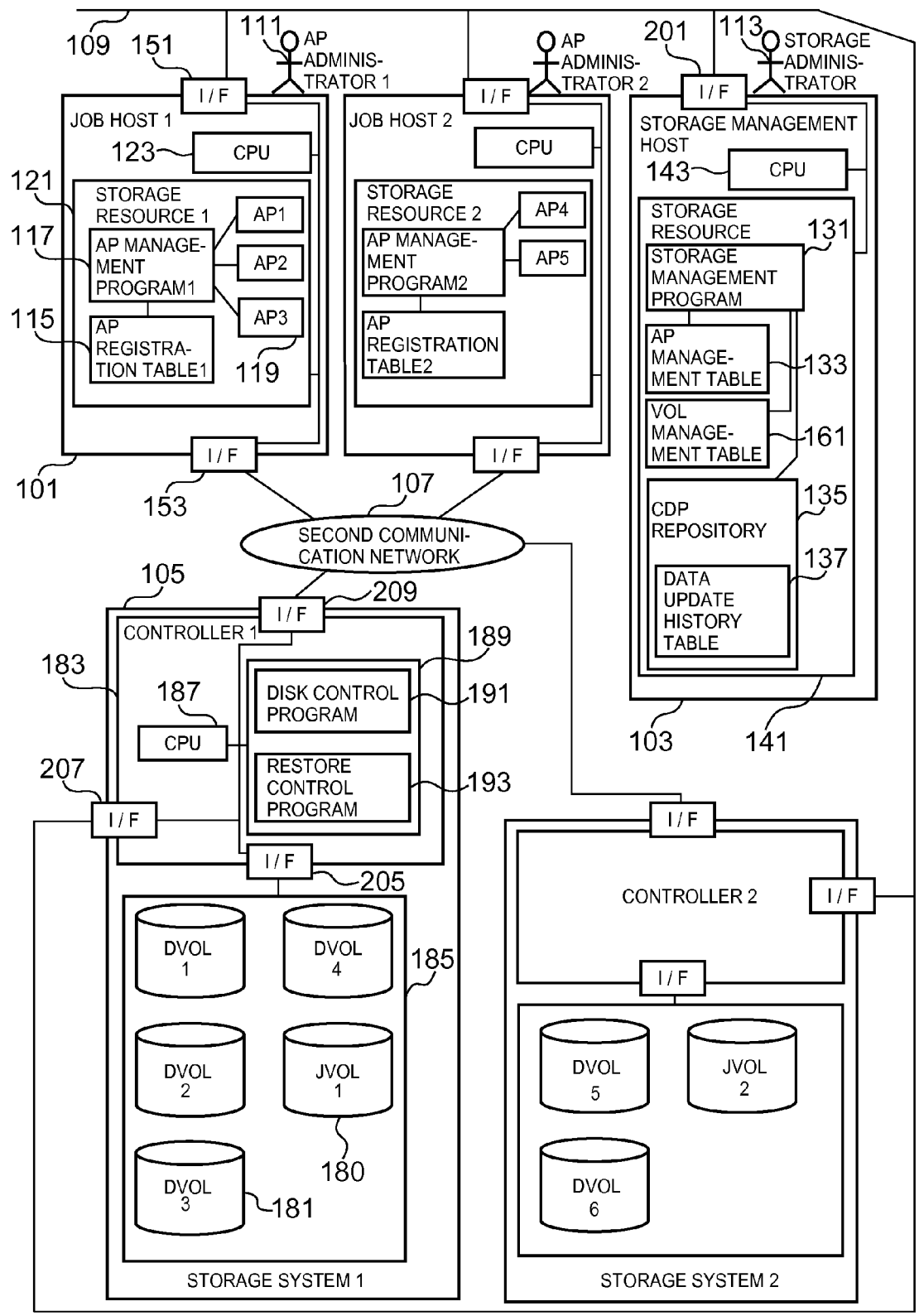
FIG. 1 shows an example of the constitution of a computer system related to a first embodiment of the present invention.

In one embodiment, each of one or more application programs executed by a host computer is constituted so as to be able to issue a write request specifying a logical volume allocated from among a plurality of logical volumes in a storage system (a storage system having a CDP (Continuous Data Protection) function for restoring data at an RPO (Recovery Point Objective) time inside a specified logical volume. A management computer of the storage system comprises a first information resource for denoting which logical volume is allocated to which application program; a volume update manager, which either regularly or irregularly acquires from the above-mentioned storage system what unit of time updating took place in which logical volume, and registers the acquired information in a second information resource; an update management information acquisition unit, which references the first and second information resources, and acquires update management information, which is information denoting what time (for example, what unit of time) updating took place in which logical volume, and to which application program this logical volume is allocated; and an update management information sending unit for sending acquired update management information to the host computer having the application program denoted by this update management information. The host computer comprises a receiver for receiving update management information from the management computer; and a host controller for displaying, based on received update management information, what time (for example, what unit of time) updating took place in which logical volume, and which application program is allocated to this logical volume. For example, application program identification information (for example, an application name and/or another type of identification information), and logical volume identification information (for example, a LUN (Logical Unit Number)) are registered in the first information resource. A logical volume identifier, and information denoting whether or not updating took place at respective units of time are registered in the second information resource.

In one embodiment, the management computer can further comprise a failure detector for detecting a failure that occurs in a storage system. In this case, the above-mentioned update management information, which is sent, comprises failure time. The host controller can display the failure time comprised in the update management information. The management computer can further comprise a restore controller for sending to the storage system a restore request, which comprises identification information for the logical volume of the storage system and RPO time. In this case, the sent update management information comprises the RPO time. The host controller can display the RPO time comprised in the update management information.

In one embodiment, there are a plurality of host computers. The update management information acquisition unit can specify an affected volume, which is a logical volume for which updating took place at a time (for example, a unit of time) comprising a failure time, by referencing the first information resource. Further, the update management information acquisition unit can specify an affected application, which is the application program to which this logical volume is allocated, by referencing the second information resource. Further, the update management information acquisition unit can acquire, as update management information, information denoting what time (for example, what unit of time) updating took place in which logical volume, and which application program is the affected application to which this affected volume is allocated. The update management information acquisition unit can send update management information to the affected application host computer of a plurality of host computers.

In one embodiment, each of one or more application programs can register the start time and end time of an operation related to the generation of a write request in a log information resource. The host controller can display, based on the log information resource, which application program was running during what time period, together with what time (for example, what unit of time) updating took place in which logical volume, and which application program is allocated to this logical volume.

In one embodiment, there are a plurality of host computers. A host controller can conceal updating at a time (for example, a unit of time) other than the period of time during which an application program was running even when updating took place in a logical volume to which this application program is allocated.

In one embodiment, a host controller is constituted so as to receive the specification of an RPO time, and to notify the above-mentioned management computer of the specified RPO time. This host controller can refuse a specification, which is a unit of time other than a period of time during with an application program was running, and which makes the RPO time a time in the unit of time during which updating took place in a logical volume to which this application program is allocated.

In one embodiment, a host controller can receive an RPO time specification via a GUI (Graphical User Interface). A first display of what unit of time updating took place in which logical volume, and which application program is allocated to this logical volume, and a second display of which application program was running during what time period are lined up side-by-side in the GUI.

In one embodiment, each of a first display and a second display is a graph or a table. A location equivalent to a certain time in the first display, and a location equivalent to this certain time in the second display are lined up in the GUI perpendicularly or horizontally.

In one embodiment, a host controller can receive the input of application program identification information to be managed, register the inputted application program identification information in a prescribed information resource, and notify the management computer. The management computer can further comprise an application identification information receiver for receiving application program identification information; and a first information resource updating unit for registering in the first information resource application program identification information and identification information for the logical volume allocated to this application program.

In one embodiment, a host controller can compute and display a recommended RPO time based on update management information from the management computer, and the above-mentioned log information resource.

In one embodiment, the management computer can further comprise a third information resource for denoting which logical volume belongs to which volume group. The update management information comprises information denoting which logical volume belongs to which volume group. The host controller can also display which logical volume belongs to which volume group.

Two or more of the above-described plurality of embodiments can be arbitrarily combined.

The above-mentioned information resource is electronic information stored in a storage resource (for example, a memory or other type of storage device), and, more specifically, for example, is a file or table. Further, the above-mentioned respective units (for example, the volume update manager, update management information acquisition unit, update information transmitter, receiver, and host controller) can be constructed using hardware, a computer program, or a combination thereof (For example, a portion can be realized using a computer program, and the remainder can be realized via hardware.). A computer program is read into a prescribed processor and executed. Further, when a computer program is read into a processor to carry out information processing, a storage area, which resides in a memory or some other such hardware resource, can be used as deemed appropriate. Further, a computer program can be installed into a computer from a CD-ROM or other such storage medium, or it can be downloaded to a computer via a communication network.

A number of embodiments of the present invention will be explained in detail hereinbelow by referring to the figures.

<First Embodiment>

<<System Configuration>>

FIG. 1 shows an example of the constitution of a computer system related to a first embodiment of the present invention. Furthermore, in the following explanation, when the explanation does not make a particular distinction between elements, the same type elements will be explained using reference numerals, and when the explanation does make a distinction between same type elements, will be explained using serial numbers assigned to the same type elements without reference numerals. For example, when two job hosts are explained without making a particular distinction between the two, they will be described as "job hosts 101" using the reference numeral 101 for the job hosts, and when two job hosts are explained by distinguishing between the two, they will be described as "job host 1" and "job host 2" using the serial numbers 1 and 2.

Two (can also be either one, or three or more) job hosts 101, one (can also be more than one) storage management host 103, and two (can also be either one, or three or more) storage systems 105 are connected to a first communication network (for example, a LAN (Local Area Network)) 109. The respective job hosts 101, storage management host 103, and respective storage systems 105 can exchange various information via the first communication network 109. A storage administrator 113 operates the storage management host 103.

Two job hosts 101 and two storage systems 105 are connected to a second communication network (for example, a SAN (Storage Area Network)) 107. The respective job hosts 101 can access (write or read data) a specified logical volume by issuing an access request, which specifies an access destination logical volume in the respective storage systems 105 via the second communication network 107.

A job host 101 is a computer for executing no less than one job application program (hereinafter, will be described simply as "AP"). A job host 101 comprises a first I/F 151, which is a communication interface device for the first communication network 109; a second I/F 153, which is a communication interface device for the second communication network 107; a CPU 123; and a storage resource (for example, a memory and/or some other type of storage device) 121. In the storage resource 121 are stored no less than one AP 119 for executing a job; an AP management program 117 for managing the no less than one AP 119; and an AP registration table 115 in which information related to the no less than one AP 119 is recorded. In the example shown in the figure, three APs 119 (AP 1, AP 2, AP 3), an AP management program 1, and an AP registration table 1 are stored in storage resource 1 of job host 1, and two job APs 119 (AP 4, AP 5), an AP management program 2, and an AP registration table 2 are stored in storage resource 2 of job host 2. Hereinafter, when a computer program is the subject of a sentence, it is supposed that processing is actually carried out by the CPU, which executes this computer program. The AP management program 117 and the AP registration table 115 will be explained in detail further below.

The storage management host 103 is a computer for managing respective logical volumes 181 inside the respective storage systems 105. The storage management host 103 comprises a first I/F 201, which is a communication interface device for the first communication network 109; a CPU 143; and a storage resource (for example, a memory and/or some other type of storage device) 141. A data update history table 137, a CDP repository 135, which is a computer program for updating the data update history table 137, an AP management table 133, which is a table for managing an AP 119, a DVOL management table 161, which is a table for managing a data volume 181, and a storage management program 131 are stored in the storage resource 141. The respective elements stored in the storage resource 141 will be explained in detail further below.

A storage system 105 comprises a controller 183; and a storage device unit 185.

The storage device unit 185 is constituted from a plurality of storage devices (for example, hard disk drives and/or flash memory drives). A plurality of logical volumes are formed based on the storage space of the plurality storage devices. The plurality of logical volumes, for example, comprise a data volume (DVOL) 181, which is a logical volume that is used by an AP 119; and a journal volume (JVOL) 180, which is a logical volume in which a journal, which is created each time data is written to a DVOL 181, is stored.

The controller 183, for example, is either one or a plurality of circuit boards, and comprises a first I/F 207, which is a communication interface device for the first communication network; a second I/F 209, which is a communication interface device for the second communication network; a third I/F 205, which is a communication interface device for the respective storage devices inside the storage device unit 185; a memory 189; and a CPU 187. A disk control program 191 and a restore control program 193 are stored in the memory 189. The disk control program 191, upon receiving a write request from a job host 101, writes data in accordance with this write request to the DVOL 181 specified in this write request, and at this time, creates a journal comprising this data, and writes the created journal to the JVOL 180. The restore control program 193, upon receiving a restore indication from the storage management host 103, responds to this restore indication by using a journal inside the JVOL 180 to restore the data for the RPO time specified by this restore indication.

Figures 2, 3:
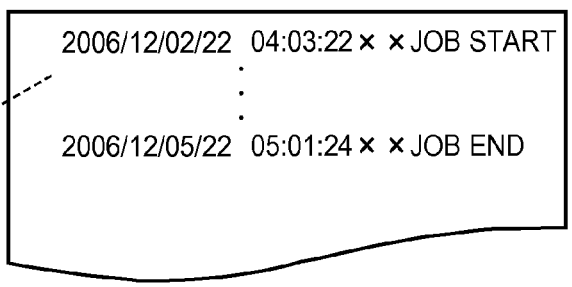
FIG. 2 shows an example of the configuration of a JVOL.
FIG. 3 shows an example of the configuration of an AP registration table.

FIG. 2 shows an example of the configuration of a JVOL 180.

The JVOL 180 shown in the figure takes JVOL 1 as an example. The JVOL 180 is configured by a management area 401 and a data area 403. A journal for data written to a DVOL 181 (updated data) is configured from this data (updated data) and management information related to the management of this data, and the management information is written to the management area 401, and the data is written to the data area 403. The management information, for example, comprises a VOL identifier (for example, a LUN), which shows the DVOL 181 into which the journal for the data is written; an update location (for example, logical block address) showing where in the DVOL 181 the data has been written; an update time (for example, year, month, day, hour, minute and second); a sequence number (SEQ#) showing the number of the storage system 107 in which the journal was created; and a pointer showing where in the data area 403 the data resides.

The update time can be the time (time stamp) comprised in the write request from a job host 101, or the time at which the journal was created.

FIG. 3 shows an example of the configuration of an AP registration table 115.

The AP registration table 115 shown in the figure takes AP registration table 1 as an example. The AP registration table 115 is referenced and updated by the AP management program 117. For example, a management AP name and log file pointer for each AP 119 are recorded in the AP registration table 115. The management AP name is the name of an AP targeted for management by the AP administrator 111. The log file pointer shows the pointer for a log file updated by an AP. When the AP 1 log file is to be referenced, the AP management program 117, for example, can access and reference the AP 1 log file from the log file pointer corresponding to the AP 1 name (management AP name).

FIG. 4 shows an example of the configuration of an AP management table 133.

The AP management table 133 is referenced and updated by the storage management program 131. The AP management table 133 is a table for managing which DVOL 181 is allocated to which AP 119 residing in which job host 101. More specifically, for each DVOL 181, for example, a VOL identifier (for example, "Volume 1"), and a AP name (for example, "AP 1") and host name (for example, "host 1") to which this DVOL 181 is allocated are recorded in the AP management table 133.

FIG. 5 shows an example of the configuration of a DVOL management table 161.

The DVOL management table 161 is a table for managing which DVOL 181 resides in which storage system 105. More specifically, for example, for each DVOL 181, a VOL identifier (for example, "volume 1") and a storage identifier (for example, "storage 1"), which is the identifier of the storage system 105 having this DVOL 181, is recorded in the DVOL management table 161.

Figures 6, 7:
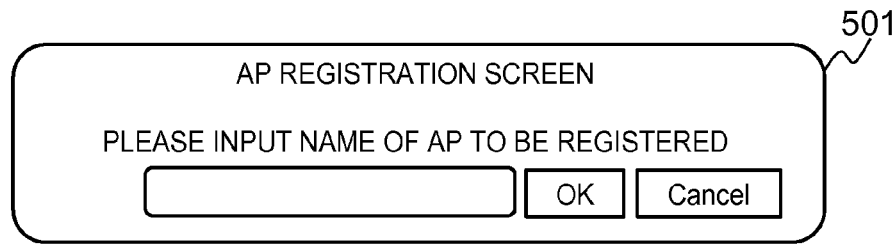
FIG. 6 shows an example of the configuration of a data update history table.
FIG. 7 shows an example of an AP registration screen.

FIG. 6 shows an example of the configuration of a data update history table 137.

The data update history table 137 is a table for managing what time there was an update (in other words, the occurrence of a difference) in which DVOL 181. More specifically, for example, the presence or absence of a difference is denoted for each DVOL 181 in the data update history table 137 at every unit of time (for example, every one second). In this embodiment, when there is a difference, a value signifying a difference (for convenience sake, called a "difference mark" hereinafter) is recorded, and when there is not a difference, nothing is recorded. However, the present invention is not limited to this, and another method can be used to denote when a difference occurred in which DVOL 181. For example, a method in which only the time when a difference occurred or the time when a difference did not occur for each DVOL 181 can be used. Further, in FIG. 6, unlike an update time, the year, month and day portions of the description are omitted for the sake of convenience, and only the hour, minute and second are mentioned for a unit of time, but of course the time can be described using the year, month and day as well. A time (for example, 19:00:01) is recorded in this table 137, but this time is not a point in time (for example, the point in time at the instant of 19:00:01), but rather, signifies time period (for example, from after 19:00:00 until 19:00:01).

The data update history table 137 can be manipulated by the CDP repository 135, and the storage management program 131 can utilize this CDP repository 135 to reference and update the data update history table 137.

<<Premise>>

An explanation of the premise of the computer system related to the first embodiment will be given hereinbelow.

The AP management program 1 responds to an indication from the AP administrator 1, receives the registration of an AP targeted for management (for example, displays the registration of the AP on the AP registration screen 501 shown in FIG. 7), registers the AP name inputted by the AP administrator 1 ("AP 1" is used here) in the AP registration table 1, and also registers the pointer of the log file created by the AP 1 corresponding to this AP name in the AP registration table 115.

Thereafter, the AP administrator 1 sends a DVOL allocation request comprising the inputted AP name "AP 1" to the storage administrator 113 (For example, the AP administrator 1 notifies the storage administrator 113 via electronic mail mentioning the DVOL allocation request and the inputted AP name "AP 1".). The storage administrator 113, who receives the request, uses the storage management program 131 to register the AP name received together with the request, the host name of the request-source job host 101, and the VOL identifier of the DVOL 181 to be allocated to this AP name in the AP management table 133. If a DVOL 181, which is allocated to at least one AP 119, is allocated, the VOL identifier of this DVOL 181, the AP name received together with the request, and the host name of the request-source job host 101 are made correspondent.

Thereafter, when the AP name of a new AP targeted for management is registered, AP name registration and DVOL allocation are carried out, and when a new DVOL 181 is to be allocated to an existing management-target AP, a DVOL 181 is allocated to this AP. If, for example, the AP administrator 1 wants to know which DVOL 181 is allocated to an AP that he is managing, the AP administrator 1 can use the AP management program 1, and reference the AP management table 133 through the storage management program 131.

An AP 119 records information denoting the execution status of this AP 119 in a log file corresponding to itself (for example, when access to a logical volume began, and when access to a logical volume ended).

When the exact update time recorded in the JVOL 180 should be a time between, for example, after N seconds (N being an integer of 0 or more but less than 60) up to N+1 seconds (when N=59, N+1=60=0) (For example, when a data update occurred after N seconds up to N+1 seconds), the disk control program 191 records the time at N+1 seconds as the update time.

The disk control program 191, either in response to a query from the storage management program 131 or independent of this, actively, either regularly (for example every second) or irregularly, sends to the storage management program 131 difference notification data (for example, the current time, and the VOL identifier of a DVOL 181 for which this time is the update time), which is data showing when an update took place (in other words, when a difference occurred) in which DVOL 181. The storage management program 131 operates the CDP repository 135 each time a prescribed amount of difference notification data (for example, one) is received, and records a difference mark in the location corresponding to the unit of time and VOL identifier specified from the difference notification data. The data update history table 137 is updated regularly in accordance with processing such as this. Using the VOL identifier as a key, it is possible to discern from the data update history table 137 the data update status (that is, at what unit of time a difference occurred) of the DVOL 181 corresponding to this VOL identifier. For example, if explained by referring to FIG. 6, it is clear that in the case of DVOL 1 (the DVOL of the VOL identifier "volume 1") differences occurred (that is, there was a data update in DVOL 1) between the time from after 18:59:59 until 19:00:00, and between the time from after 19:00:00 until 19:00:01, but no differences occurred between the time from after 19:00:01 until 19:00:04.

The disk control program 191, in response to a copy indication from a job host 101 or a storage management host 103, can create a copy of a DVOL 181 specified in this copy indication. Since this copy is treated as the base for a restore, hereinafter, this copy will be called the "base VOL". In a storage system 105, VOL management information, which denotes which VOL is a base VOL, and at what time this base VOL is the base VOL in which DVOL 181, is stored, for example, in the memory 189.

The storage management program 131, for example, receives from the storage administrator 113 a RPO time specification and a VOL identifier of a DVOL 181 targeted for a restore. The storage management program 131, in response to this specification, creates a restore indication comprising the RPO time and VOL identifier, specifies the storage identifier corresponding to this VOL identifier from the DVOL management table 161, and sends this created restore indication to the storage system 105 identified from the specified storage identifier. The restore control program 193 receives this restore indication, and commences restore processing in response to this restore indication. In a restore process, for example, a base VOL, which is the base VOL corresponding to the DVOL (hereinafter called "specified DVOL") 181 identified from the VOL identifier in the restore indication, and which is the copy of the specified DVOL 181 at a time, which is a previous but recent time from the RPO time (called the "base time" here), is specified. Then, the respective data inside the respective journals of the specified DVOL 181, from after the base time until the RPO time in the specified base VOL, is sequentially written to the base VOL. Thereafter, the VOL identifier of the base VOL and the current VOL identifier of the specified DVOL 181 are swapped (that is, path switching is carried out inside the storage system 105). Consequently, the restore process ends, and the AP 119, which will use the specified DVOL 181, can access the base VOL in which the restored data is stored after the VOL identifier swap. That is, the AP 119 can utilize the restored data.

<<AP Management Support>>

An explanation of support for managing an AP 119 will be given below. A number of cases can be cited for AP 119 management support, but the following three cases will be taken up and explained as typical examples.

(1) First case: A storage failure occurs, and the storage administrator 113 determines the RPO time and restores data irrespective of the AP 119 execution status.

(2) Second case: A storage failure occurs, and the AP administrator 111 determines the RPO time, and makes a restore request to the storage administrator 113.

(3) Third case: Independent of a storage failure occurring, the AP administrator 111 determines the RPO time, and makes a restore request to the storage administrator 113.

Figure 12:
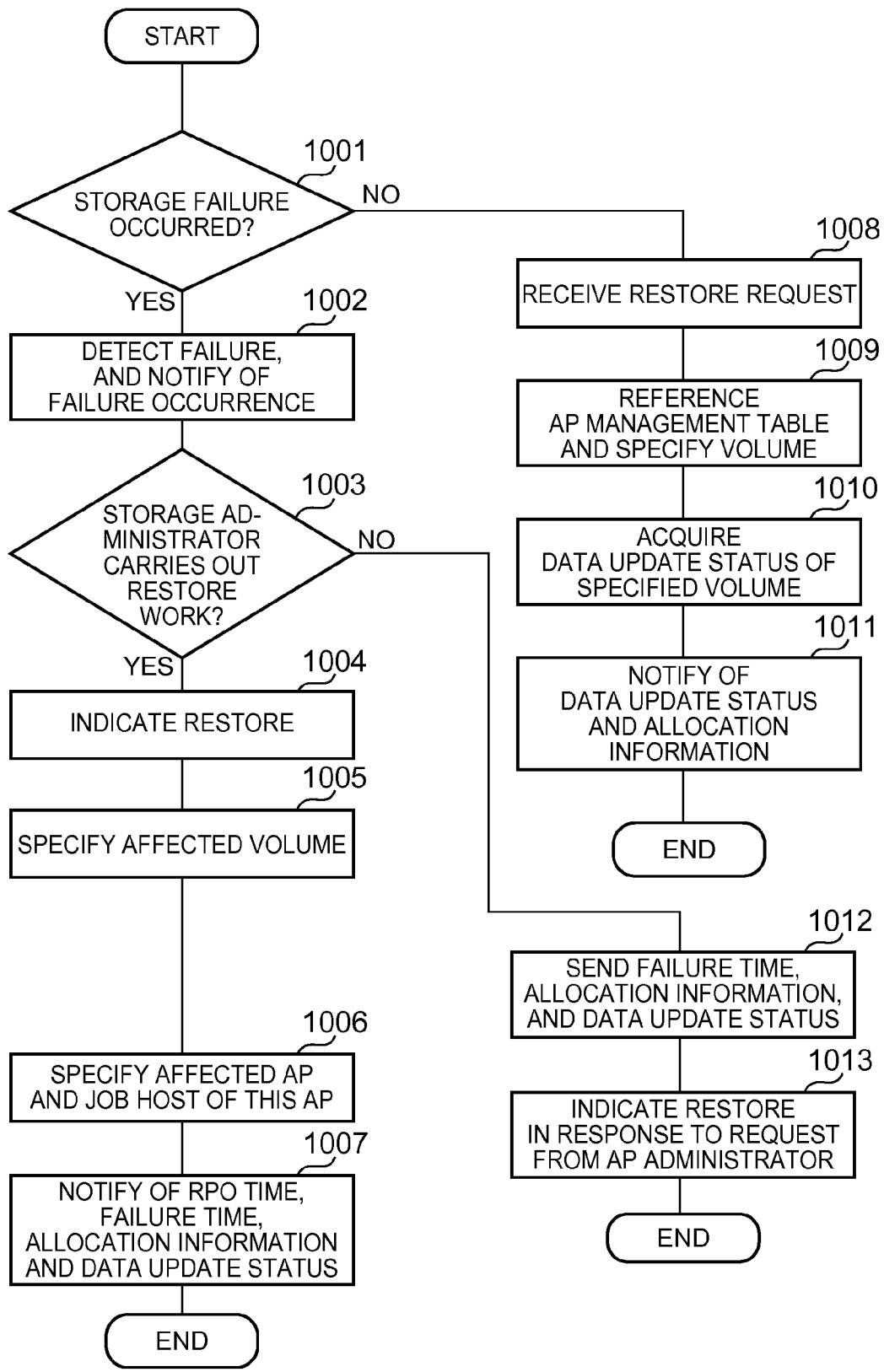
FIG. 12 shows the flow of processing carried out by a storage management program.
Figure 13:
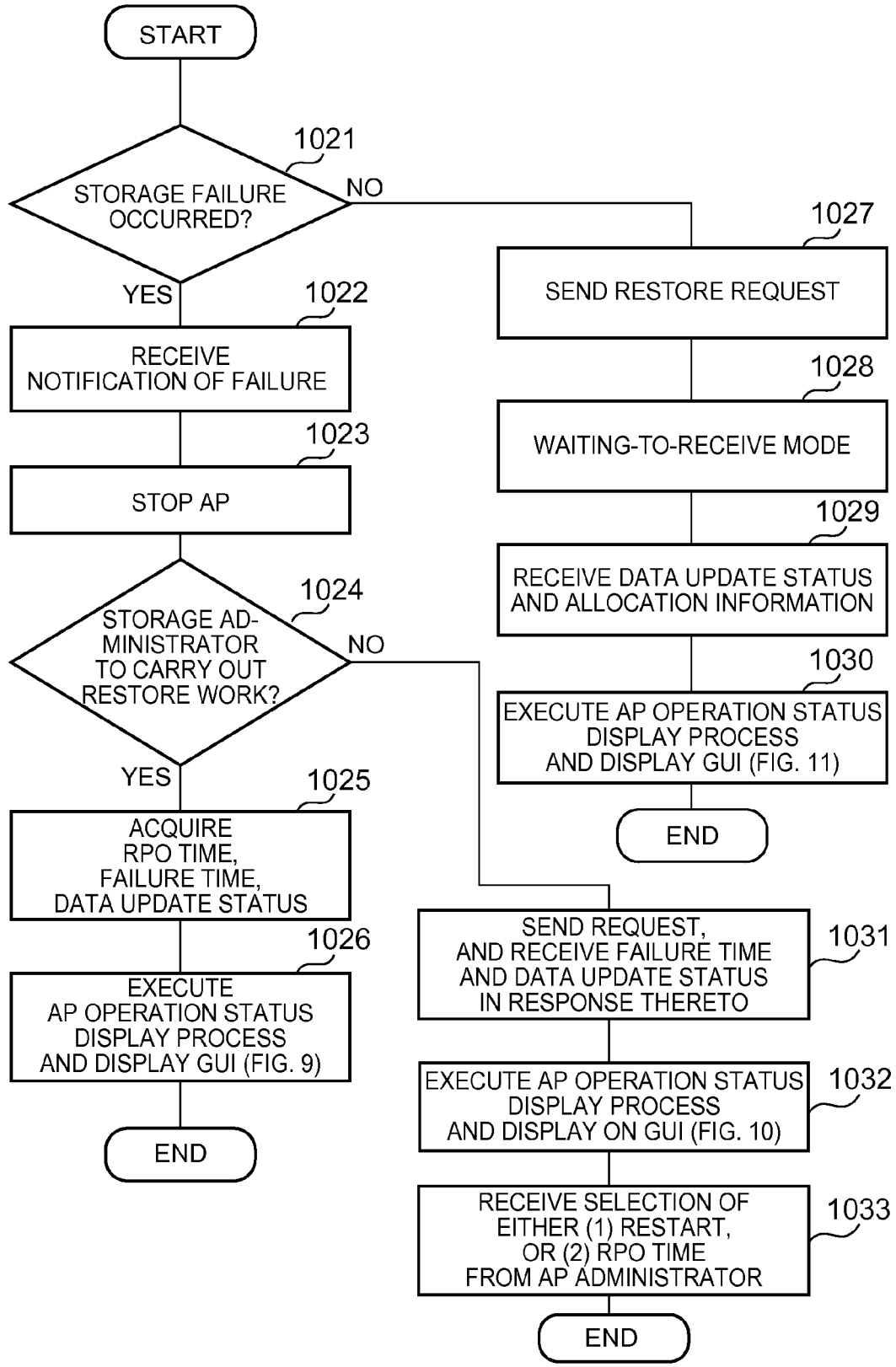
FIG. 13 shows the flow of processing carried out by an AP management program.
Figure 14:
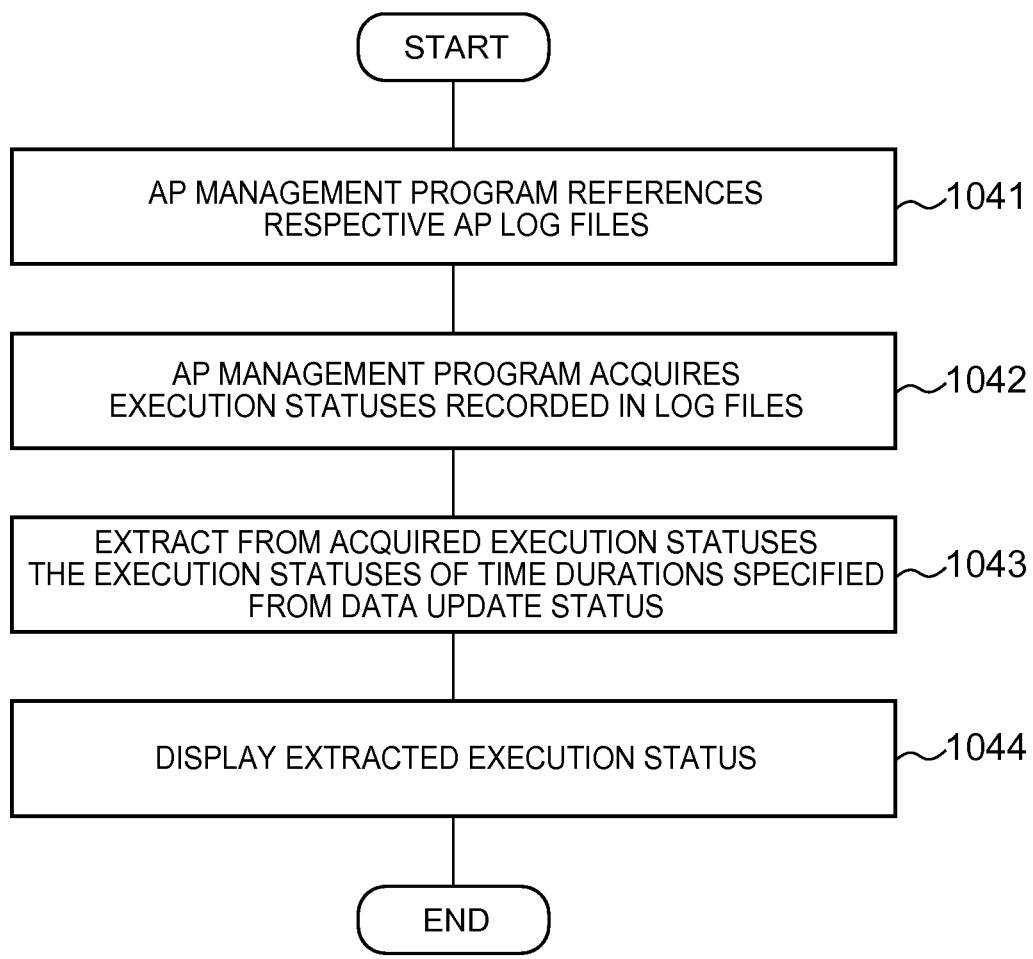
FIG. 14 shows the flow of AP execution status display processing carried out in FIG. 13.

The flows of processing for the three cases are covered in FIGS. 12, 13 and 14. FIG. 12 shows the flow of processing carried out by the storage management program 131. FIG. 13 shows the flow of processing carried out by the AP management program 117. FIG. 14 shows the flow of processing for displaying the AP execution status executed in FIG. 13.

The above-mentioned three cases will be explained hereinbelow by referring to FIGS. 12 through 14 as deemed appropriate.

(First case: A storage failure occurs, and the storage administrator 113 determines the RPO time and restores data irrespective of the AP 119 execution status.)

A storage failure is a malfunction that occurs in a storage system 105. When a storage failure occurs (YES in Step 1001 of FIG. 12), the storage management program 131 detects the fact that a storage failure has occurred, and the time at which the storage failure occurred (hereinafter, failure time), and notifies the respective AP management programs 117 of the storage failure (Step 1002 of FIG. 12). In the following explanation, it is supposed that the failure time is 19:00:04.

When a storage failure occurs (YES in Step 1021 of FIG. 13), the AP management program 117 receives notification of the storage failure (Step 1022 of FIG. 13), and stops (Step 1023 of FIG. 13) the management-target AP (an AP having the AP name registered in the AP management table 115) 119 in response to an indication from the AP administrator 111, or in response to the notification of a storage failure.

A determination is made as to whether or not the storage administrator 113 will carry out a restore operation (Step 1003 in FIG. 12, ands Step 1024 in FIG. 13). The determination of Step 1003, for example, is possible by receiving from the storage administrator 113 input as to whether data is to be restored at an RPO time decided by the storage administrator 113, or whether data is to be restored at an RPO time decided by the AP administrator 111. If the result of the determination is negative, processing proceeds to Step 1012 in FIG. 12, but in this case, because the storage administrator 113 decides the RPO time, the determination result is positive, and processing proceeds to Step 1004 of FIG. 12. The determination of Step 1024, for example, is possible by receiving from the AP administrator 111 input as to whether to leave the decision of the RPO time up to the storage administrator 113, or to restore data at an RPO time decided by the AP administrator 111. If the result of the determination is negative, processing proceeds to Step 1031 of FIG. 13, but in this case, because the storage administrator 113 decides the RPO time, the determination result is positive, and processing proceeds to Step 1025 of FIG. 13.

The storage administrator 113 sets the RPO time in the storage management program 131. For example, the storage administrator 113 sets the RPO time immediately prior to the failure time (for example, one second prior) to shorten as much as possible the amount of time to restore data. The storage management program 131 creates a restore indication comprising the set RPO time (for example, 19:00:03) and the VOL identifier of the restore-target DVOL 181, and sends this restore indication to the storage system 105 in which the storage failure occurred (Step 1004 of FIG. 12). Here, for example, the VOL identifier comprised in the restore indication is treated as the VOL identifier respectively corresponding to all the DVOL 181 residing in the storage system 105 in which the storage failure occurred. In the storage system 105, the restore control program 193 responds to this restore indication, executes restore processing for all the DVOL 181 specified in this restore indication, and when restore processing ends, sends a restore-end report to the storage management host 101.

Figure 8:
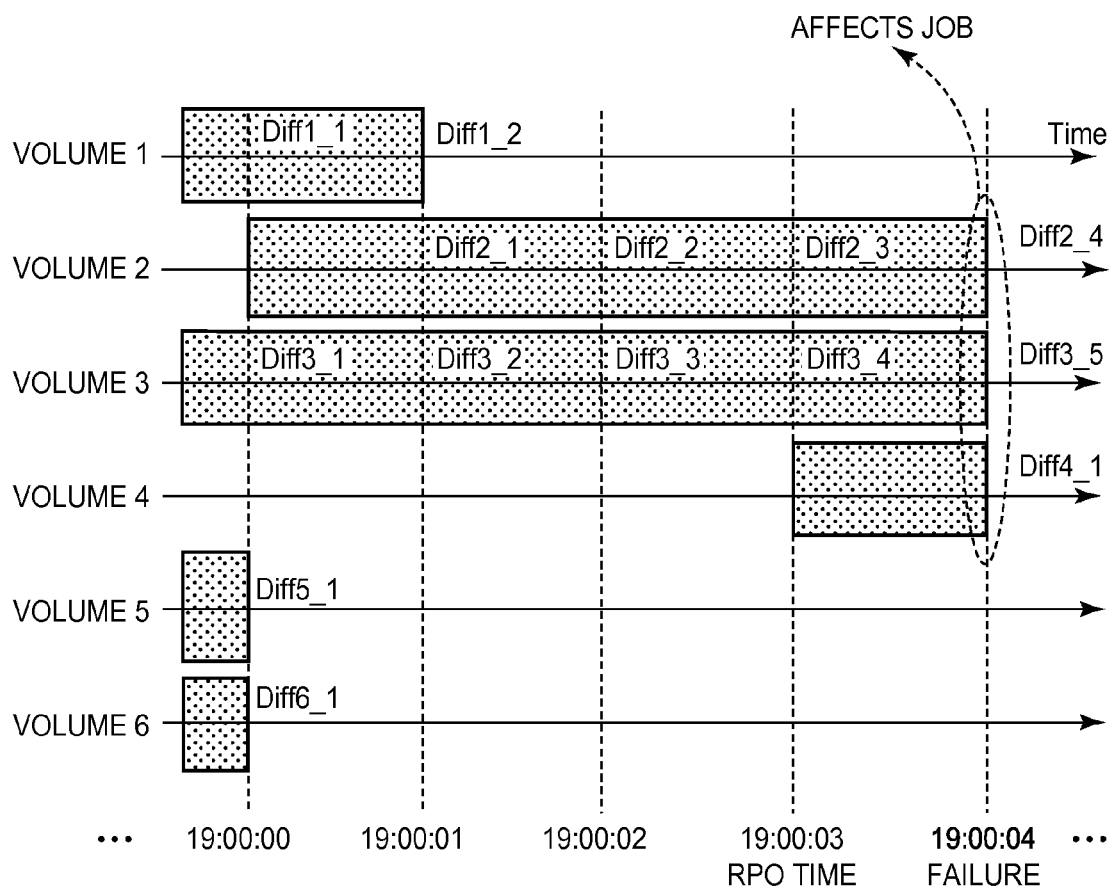
FIG. 8 is a schematic diagram of the specification of a DVOL having data, which affects a job.

The storage management program 131 specifies the DVOL (hereinafter, affected DVOL) in which operations are affected by the restore (Step 1005 of FIG. 12). This will be explained more specifically by referring to FIG. 8. FIG. 8 is a diagram showing whether or not differences occurred in DVOLs 1 through 6 (volumes 1 through 6) at each second from after 18:59:59 until the failure time of 19:00:04 based on the data update history table 137 of FIG. 6. The times at which differences occur in the respective DVOLs 181 are recorded in the data update history table 137, and, for example, the failure time (for example, 19:00:04) is recorded as the time. The storage management program 131 references the data update history table 137, and specifies as the affected DVOL the DVOL 181 in which a difference occurred at a time after the RPO time (for example 19:00:03), which was set by the storage administrator 113, and specified by the restore indication. The reason the DVOL 181 in which a difference occurred at a time after the RPO time becomes the affect DVOL is because a data update of after the RPO time is rendered invalid by the restoring of data at the RPO time, and affects a job, which uses a volume in which restored data resides. In the example of FIG. 8, DVOL 2 (volume 2), DVOL 3 (volume 3) and DVOL 4 (volume 4), in which differences occurred after the RPO time (19:00:03) until the failure time (19:00:04), are specified as the affected DVOL.

In Step 1006 of FIG. 12, the storage management program 131 uses the VOL identifiers of the affected DVOL as a key and by referencing the AP management table 133 specifies an AP 119, which will execute a job that will be affected by the restore (that is, the AP name corresponding to this VOL identifier), and to specify the job host 101, which will execute this AP 119 (that is, the host name corresponding to this VOL identifier).

In Step 1007 of FIG. 12, the storage management program 131, for example, sends the following four types of information elements to the AP management program 117 of the specified job host 101.

(1) The RPO time specified by the restore indication of Step 1004 (for example, 19:00:03).

(2) The failure time (for example, 19:00:04)

(3) Allocation information, which denotes which DVOL 181 is allocated to which management-target AP 119 of the notification-destination AP management program 117 (for example, the DVOL 181 corresponding to the AP name and VOL identifier specified from the AP management table 133).

(4) The data update status of the respective DVOLs 181 allocated to the respective management-target APs 119 (for example, the DVOLs 181 corresponding to the times and presence or absence of difference marks specified from the data update history table 137).

In Step 1025 of FIG. 13, the AP management program 117 receives the above-mentioned four types of information elements (information elements (1) through (4)).

Figure 9:
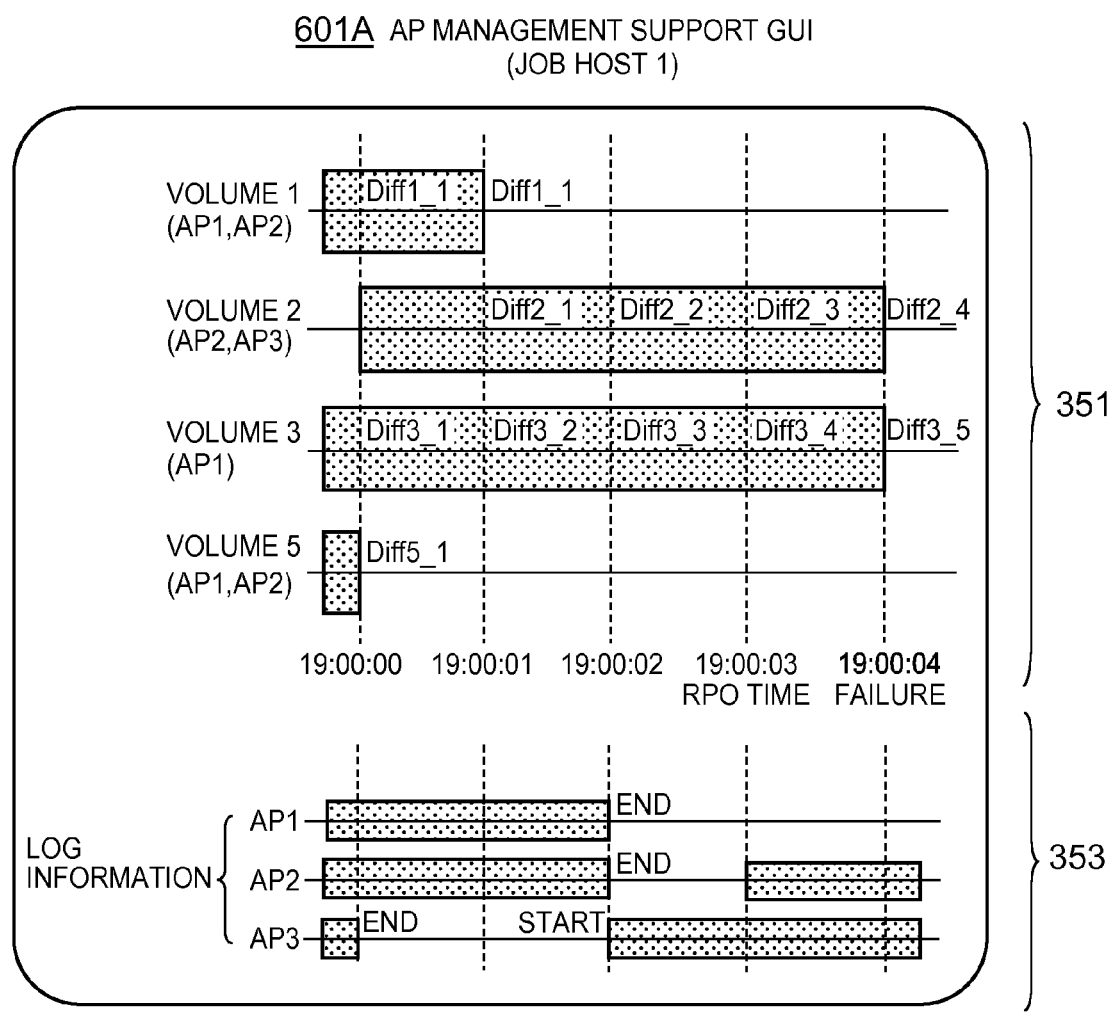
FIG. 9 shows an example of an AP management support GUI of a first case.

In Step 1026 of FIG. 13, the AP management program 117 executes AP execution status display processing based on the received four types of information elements, creates the AP management support GUI (Graphical User Interface) 601A shown in FIG. 9, and displays this GUI 601A on a not-shown display device of job host 101. The creation and display of AP management support GUI 601A of FIG. 9 will be explained in detail below.

The AP management support GUI 601A of FIG. 9 is an example of a GUI, which is displayed by the AP management program 1 of job host 1. The AP management program 1 receives information denoting that volume 1, volume 3 and volume 5 are allocated to AP 1, and volume 2 and volume 5 are allocated to AP 2 as allocation information of information element (3). Further, the AP management program 1 receives the respective data update statuses of volume 1, volume 2, volume 3 and volume 5 allocated to AP 1, AP 2 and AP 3, which are targeted for management, as the data update statuses of information element (4), and does not receive (or, can be controlled so as not to display even if received) the data update statuses of other DVOL 181 (that is, DVOL 181 that are not allocated to management-target AP 119).

The AP management program 1 lines up and displays the data update statuses of volumes 1, 2, 3 and 5 (the differences that occurred at what times to which DVOL), and the execution statuses of APs 1, 2 and 3 (which APs are running at what times). Hereinafter, for the sake of convenience, the area 351 in which the data update statuses are displayed will be called "data update status display area 351", and the area 353 in which the execution statuses of the APs are displayed will be called "AP execution status display area 353". The data update status display area 351 and AP execution status display area 353, respectively, can also be GUIs, which are constituted such that the displays are scrollable.

Four time axes (time axes that extend horizontally) corresponding respectively to the four volumes 1, 2, 3 and 5 are prepared in the data update status display area 351, and the four time axes are arranged at intervals in the vertical direction. The respective locations on the thus arranged four time axes are lined up perpendicularly, and signify the same time.

Characters (for example, a VOL identifier and AP name) denoting which DVOL a time axis corresponds to, and which DVOL is allocated to which AP are displayed in the proximity of the respective time axes.

Difference-signifying strip-shaped diagrams (for example, semitransparent diagrams) of a length equivalent to a one second period are stackedly displayed in locations corresponding to one second periods corresponding to difference marks based on the data update statuses of information element (4). If differences occur consecutively for K seconds (K being an integer of no less than 2), the strip-shaped diagrams become continuous, and thus, as a result, the length of the strip-shaped diagrams becomes the length of this K second period.

In the proximity of (for example, immediately below) the respective locations on at least one time axis of the four time axes there is displayed numerals denoting a time equivalent to these locations. Further, of the plurality of times displayed, the time, which is the failure time, is displayed in such a way as to further signify that it is the failure time (for example, the characters "failure" are displayed, or the numerals denoting the time are displayed in bolded form by changing their color or thickness). Further, of the plurality of times displayed, the time, which is the RPO time, is displayed in such a way as to further signify that it is the RPO time (for example, the characters "RPO time" are displayed, or the numerals denoting the time are displayed in bolded form by changing their color or thickness).

Three time axes (time axes that extend horizontally) corresponding respectively to the three APs 1, 2, and 3 are prepared in the AP execution status display area 353, and the three time axes are arranged at intervals in the vertical direction. The vertically aligned respective locations on the thus arranged three time axes and the four time axes arranged in the data update status display area 351 signify the same times.

Characters (for example, an AP name) denoting which AP a time axis corresponds to are displayed in the proximity of the respective time axes.

Operation-signifying strip-shaped diagrams (for example, semitransparent diagrams hereinafter), which signify operation in progress, of a length equivalent to a one second period are stackedly displayed in locations corresponding to one second periods corresponding to an operation in progress based on the execution status information recorded in log files corresponding to the respective APs. If operation is continuous for K seconds (K being an integer of no less than 2), the strip-shaped diagrams also become continuous, and thus, as a result, the length of the strip-shaped diagrams becomes the length of this K second period.

The AP execution status display, for example, can be carried out by the AP execution status display process shown in FIG. 14. That is, the AP management program 1 respectively references the log files of management-target APs 1, 2 and 3 (Step 1041), and acquires the execution statuses of APs 1, 2 and 3 (Step 1042). Then, the AP management program 1 extracts the execution statuses during the time span (for example, from after 18:59:59 until 19:00:04) denoted by the data update status from the acquired respective execution statuses (step 1043), and displays the extracted execution statuses in the AP execution status display area 353 (Step 1044).

The AP administrator 1, who references the above-mentioned AP management support GUI 601A, can specify an AP, which was affected by a data restore resulting from a storage failure. Even if a plurality of APs share one DVOL, it is still possible to specify which AP was used to carry out a data update to a DVOL because the execution statuses of the AP are displayed side-by-side with the data update statuses of the DVOL. From the GUI 601A of FIG. 9, it is clear that updating took place subsequent to the RPO time in DVOL 2 and DVOL 3, and that AP 2 and AP 3 ran subsequent to the RPO time, and that the operations of AP 2 and AP 3 can be restarted. Further, as for what time operation should be restarted, it is clear that AP 3 was in operation at 19:00:03, and thus, it is desirable that operation be started at 19:00:02 or later. For this reason, the AP administrator 1 can continue a job by restarting the operation of AP 3 at 19:00:02 or later, and restarting the operation of AP 2 at 19:00:03 or later.

Furthermore, for a volume that is not directly affected by a restore, from a job standpoint, the AP administrator 111 can notify the storage administrator 113 of a restore-target DVOL and a desired RPO time when a restore is deemed necessary.

(Second case: A storage failure occurs, and the AP administrator 111 determines the RPO time, and makes a restore request to the storage administrator 113.)

When a storage failure occurs (YES in Step 1001 of FIG. 12), the storage management program 131 executes storage failure detection and notification (Step 1002 of FIG. 12). When a storage failure occurs (Yes in Step 1021 of FIG. 13), the AP management program 117 receives notification of a storage failure (Step 1022 of FIG. 13) and stops the management-target AP 119 (Step 1023 of FIG. 13).

A determination is made as to whether or not the storage administrator 113 will carry out a restore operation (Step 1003 in FIG. 12, and Step 1024 in FIG. 13). In this case, the determination result of Step 1003 of FIG. 12 is negative, and processing proceeds to Step 1012, and similarly, the determination result in Step 1024 of FIG. 13 is negative, and processing proceeds to Step 1031 of FIG. 13

In Step 1012 of FIG. 12, the storage management program 131, for example, sends the following three types of information elements to the AP management program 117.

(1) Failure time (for example, 19:00:04), (2) Allocation information, which denotes which DVOL 181 is allocated to which management-target AP 119 of the notification-destination AP management program 117 (for example, the DVOL 181 corresponding to the AP name and VOL identifier specified from the AP management table 133), (3) The data update status of the respective DVOLs 181 allocated to the respective management-target APs 119 (for example, the DVOLs 181 corresponding to the times and presence or absence of difference marks specified from the data update history table 137).

In Step 1031 of FIG. 13, the AP management program 117 receives the above-mentioned three types of information elements (information elements (1) through (3)).

Figure 10:
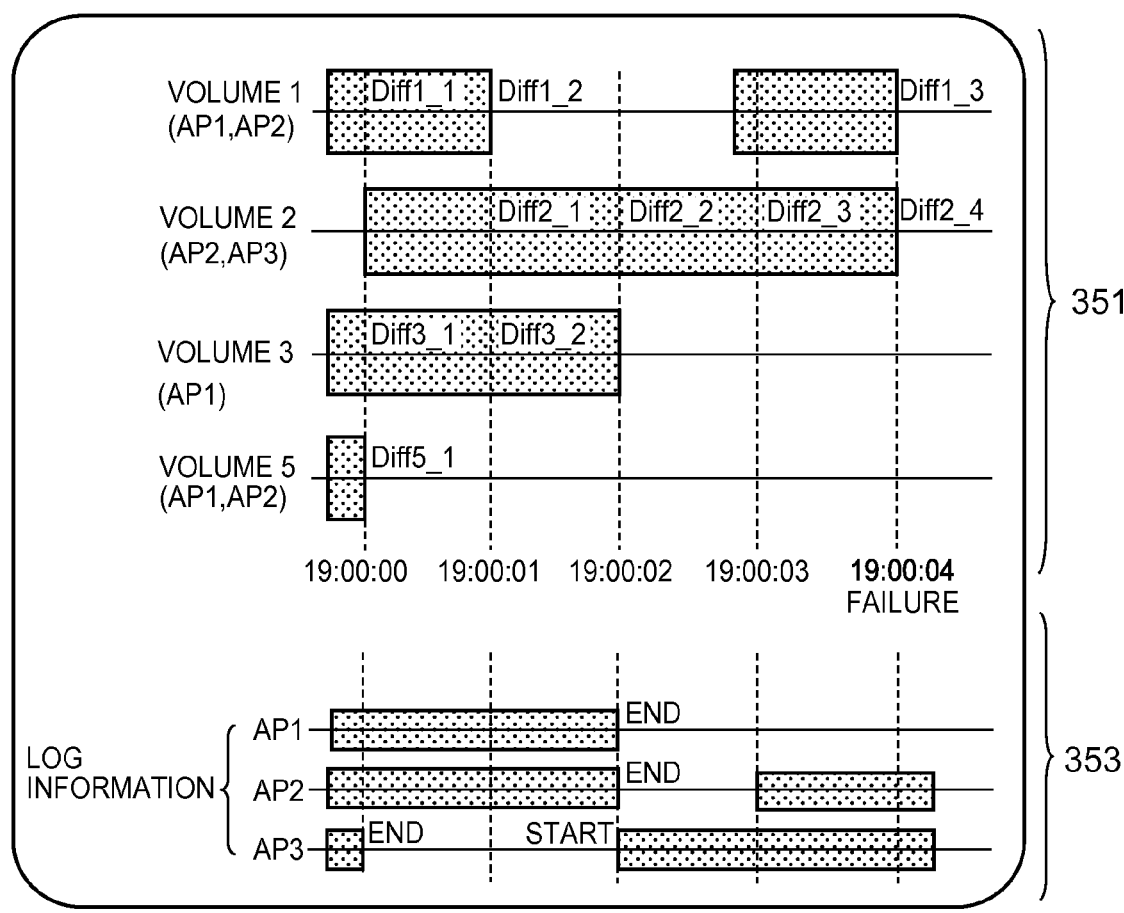
FIG. 10 shows an example of an AP management support GUI of a second case.

In Step 1032 of FIG. 13, the AP management program 117 executes AP execution status display processing based on the received three types of information elements, creates the AP management support GUI 601B shown in FIG. 10, and displays this GUI 601B on a not-shown display device of job host 101.

In Step 1033 of FIG. 13, the AP management program 117 receives either a (1) restart, or (2) RPO time. The restart of (1) is a process for restarting a job for an affected AP without issuing a restore request to the storage management program 131. The RPO time of (2) is an RPO time that the AP administrator 111 considers to be the most opportune from the job standpoint. In addition to an RPO time, the AP management program 117 also receives a choice of which DVOL to make the restore target. The AP management program 117, for example, can select to automatically make the DVOL in which a difference occurs at the set RPO time the restore target. Upon receiving an RPO time, the AP management program 117 notifies the storage management program 131 of this RPO time and the VOL identifier of the selected DVOL. In this case, the storage management program 131 sends a restore indication specifying this RPO time and this VOL identifier to the storage system 105 of the DVOL corresponding to this VOL identifier (Step 1013 of FIG. 12).

The AP management support GUI 601B of FIG. 10 will be explained. Furthermore, to make it easier to understand the characteristic features of the processing in this second case, the display of the data update status in FIG. 10 does not correspond to that of the above-described first case.

Unlike the GUI 601A of FIG. 9, this FIG. 10 does not display the characters RPO time. This is because, since the AP administrator 111 carries out the RPO time setting in this second case, the RPO time is not notified from the storage management program 131.

Looking at this GUI 601B of FIG. 10, the AP administrator 1 sees that the affected DVOLs are volume 1 and volume 2. This is because differences are occurring up until the failure time.

Further, since both AP 2 and AP 3 are running when the failure occurs, the AP administrator 1 learns that volumes 1 and 2, which are the affected DVOLs, are being operated by AP 2 and AP 3.

Based on his understanding of these statuses, the AP administrator 1 knows that 19:00:02 is the optimum RPO time. This is because 19:00:02 constitutes the boundary line between the end of operations for AP 1 and AP 2, and the start of operation of AP 3. Furthermore, this status determination can also be carried out by the AP management program 1. That is, based on the data update status from information element (3) and the respective log files of management-targets AP 1, AP 2 and AP 3, the AP management program 1 can carry out the above-described status determination, compute a recommended RPO time, and display the computed RPO time on the above-mentioned GUI 601B. This can also be applied in the same way to the third case, which will be explained hereinbelow.

The preceding is an explanation of the second case. Furthermore, details of the processing for displaying the GUI can be made the same as the processing of the first case. This also holds true for the following third case.

(Third case: Independent of a storage failure occurring, the AP administrator 111 determines the RPO time, and makes a restore request to the storage administrator 113.)

When Step 1021 of FIG. 13 results in NO, the AP management program 117 sends a restore request to the storage management program 131 in Step 1027 of FIG. 13. This restore request comprises AP information. This AP information is information comprising AP names, which are acquired by the AP management program 117 referencing the AP registration table 115.

When Step 1001 of FIG. 12 results in NO, the storage management program 131 receives a restore request in Step 1008 of FIG. 13. The storage management program 131 specifies the DVOLs corresponding to the respective AP names comprised in the AP information in the restore request by referencing the AP management table 133 (Step 1009). Then, the storage management program 131 specifies the data update status of this DVOL from the data update history table 137 (Step 1010). The storage management program 131 sends allocation information comprising the VOL identifier of the DVOL specified in Step 1009, and the data update status specified in Step 1010 to the AP management program 117, which is the source of the restore request (Step 1011).

The AP management program 117 transitions to the waiting-to-receive mode subsequent to Step 1027 of FIG. 13 (Step 1028), and receives the allocation information and data update status from the storage management program 131 (Step 1029). Then, the AP management program 117 executes AP execution status display processing, and displays the AP management support GUI 601C shown in FIG. 11 (Step 1030).

Figure 11:
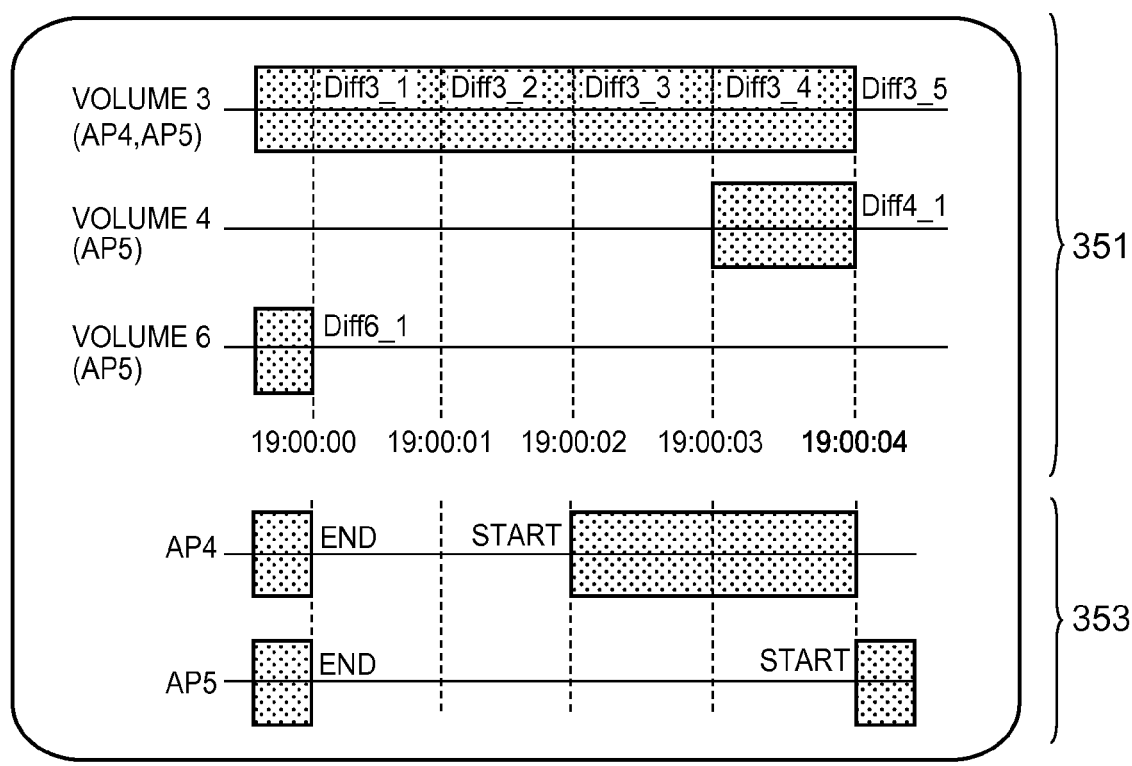
FIG. 11 shows an example of an AP management support GUI of a third case.

The AP management support GUI 601C of FIG. 11 takes the GUI displayed on job host 2 as an example. Thanks to this GUI 601C, when the AP administrator 2 is considering restarting the job of AP 4, he knows that 19:00:01 and 19:00:02 are possible selections as the RPO time. Further, it is clear that, despite the fact that the start of operations for AP 4 is 19:00:02, because a difference occurred in volume 3 at a time of after 19:00:01 until 19:00:02, this time was subjected to a difference resulting from the operation of an AP of another job host. Therefore, making 19:00:01 the RPO time will clearly render the data update by the AP of the other job host invalid.

Accordingly, the AP administrator 2 can select 19:00:02 as the RPO time, and can input to the AP management program 2 a request to restore data in volume 3 and volume 4 at this RPO time (19:00:02) with the understanding that it will not impede the job and will not adversely affect another job host if only the AP 4 job, which he is managing himself, is restarted. In response to this input, the AP management program 2 sends to the storage management program 131 a restore request comprising volumes 3 and 4, and an RPO time of 19:00:02. The storage management program 131 can respond to this restore request by sending to the storage system 105 a restore indication having an RPO time (19:00:02) and volumes 3 and 4 as restore targets.

Figure 15:
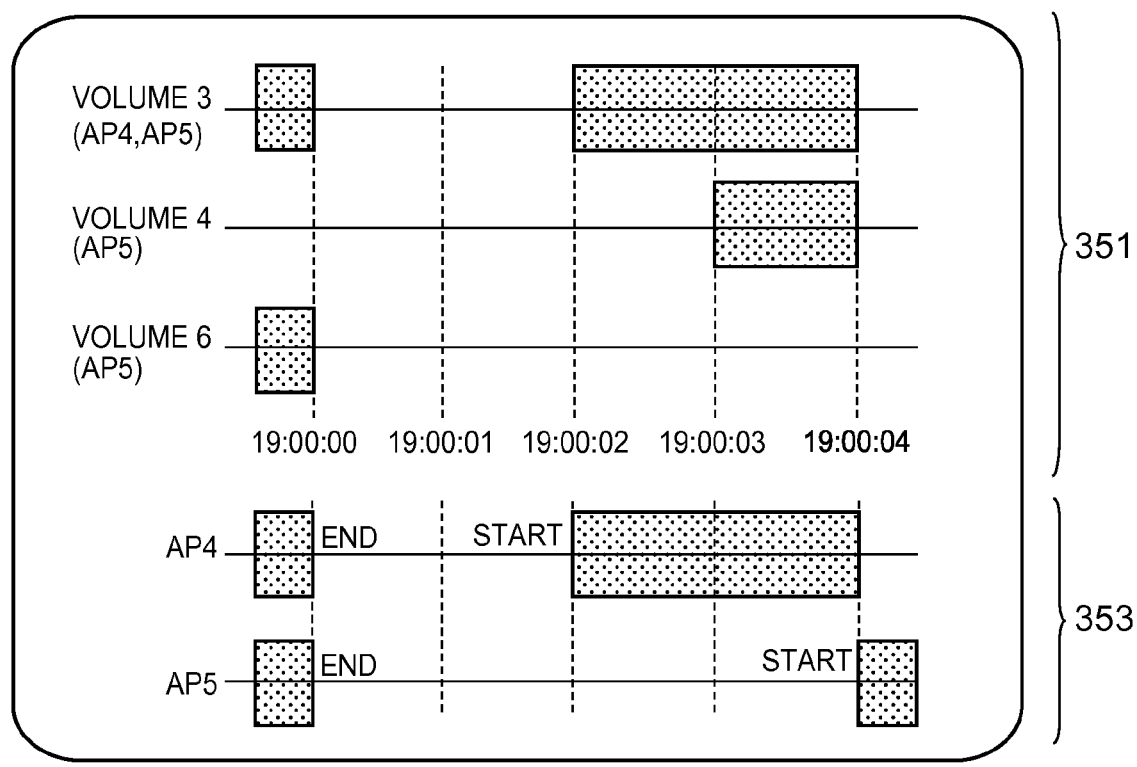
FIG. 15 shows a variation of the AP management support GUI of the third case.

Furthermore, in the example of FIG. 11, since strip-shaped diagrams denoting differences are displayed on the volume 3 time axis despite the fact that the job host 2 is not running either AP 4 or 5, it is clear that the differences are being caused by the operation of an AP of another job host, and when the times at which the differences occurred do not coincide with the times at which the management-target APs 4 and 5 are running, the AP management program 2, for example, can conceal the strip-shaped diagrams denoting that there is a difference as shown in FIG. 15 even if a difference occurs (or configured not to conceal).

Further, the AP management program 2 can refuse to accept an RPO time for a time at which a difference has occurred due to the operation of an AP of another job host. For example, the AP management program 2 can display the message "Cannot be selected" when 19:00:01 is selected as the RPO time. Furthermore, in this case, the fact that a difference occurred due to an operation in the other job host 1 can be displayed as shown in FIG. 11, or the fact that a difference occurred due to an operation in the other job host 1 can be concealed (not displayed) as shown in FIG. 15.

<Second Embodiment>

A second embodiment of the present invention will be explained hereinbelow. Hereinafter, the points of difference with the first embodiment will mainly be explained, and explanations of those points that the second embodiment has in common with the first embodiment will be simplified or omitted.

In the second embodiment, no less than two DVOLs of a plurality of DVOLs are managed as a single volume group.

Figures 16, 17:
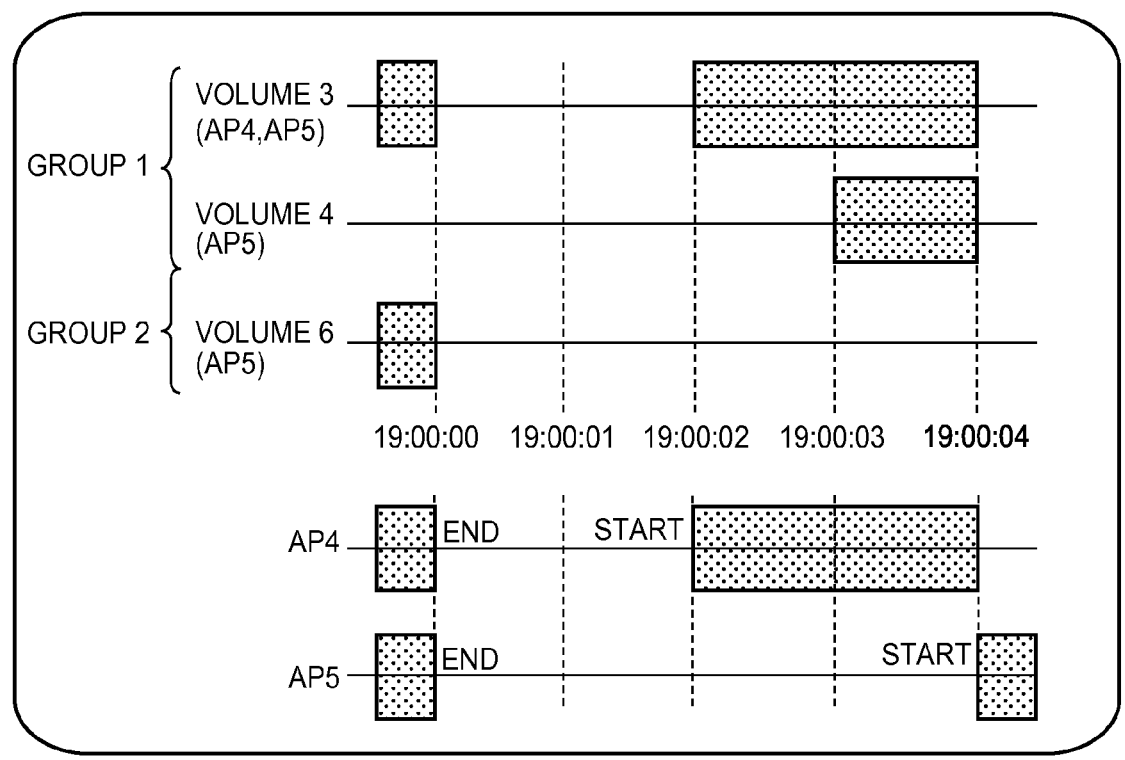
FIG. 16 shows an example of the configuration of a DVOL management table of a second embodiment of the present invention.
FIG. 17 shows an example of the AP management support GUI displayed in the second embodiment.

FIG. 16 shows an example of the configuration of a DVOL management table of the second embodiment.

Which DVOLs belong to which volume group is also registered in the DVOL management table 161'. For example, volume group names corresponding to the VOL identifiers of the respective DVOLs are registered. A volume group can be constituted from no less than two DVOL 181 in one storage system, or a volume group can be constituted from no less than two DVOLs 181 residing in a plurality of storage systems (That is, a volume group can span a plurality of storage systems.). For example, volume group 3 spans storage systems 1 and 2. In this case, for example, when the storage management program 131 indicates a restore due to a storage failure in storage system 1, since volume 1 inside storage system 1 makes up volume group 3 together with volume 6 of storage system 2, the storage management program 131 can send, also for volume 6, a restore indication specifying the same RPO time to storage system 2.

FIG. 17 shows an example of an AP management support GUI 601 in the second embodiment.

The AP management support GUI 601 displays which DVOLs belong to which volume groups. For example, the group names of volume groups of DVOLs corresponding to VOL identifiers are displayed near these VOL identifiers, which are written in the proximity of the respective time axes in the data update status display area 351. The AP administrator 111 can also take into account which DVOLs belong to which volume groups when sending a restore request to the AP management program 117. More specifically, for example, when the AP administrator 111 wants to make volume 4 a restore target, because volume 3 belongs to the same volume group as this volume 4, the AP administrator 111 can specify to the AP management program 117 to carry out a restore that has as the restore target volume 3 as well as volume 4.

A number of embodiments of the present invention have been explained hereinabove, but these are examples for explaining the present invention, and do not purport to limit the scope of the present invention solely to these embodiments. The present invention can be put into practice in a variety of other modes. For example, the host computer can also send a restore indication to a storage system. Further, for example, the present invention is not limited to graph format displays such as those shown in FIGS. 9 and 10, but rather displays can be of other types of formats, more specifically, displays can be of the table format shown in FIG. 18. In FIG. 18, the respective rows correspond to respective units of time, and for volume update status, filled-in cells signify units of time for which updating has occurred, and for AP execution status, filled-in cells signify units of time in which APs are running.

What is claimed is:

1. An application management support system, comprising:
   a host computer for executing one or more application programs; and
   a management computer for managing a storage system,
   wherein the storage system includes a plurality of logical volumes and a CDP (Continuous Data Protection) function for restoring data at an RPO (Recovery Point Objective) time stored in a specified logical volume among the plurality of logical volumes,
   wherein the application programs are configured to issue a write request specifying a logical volume among the plurality of logical volumes,
   wherein the management computer comprising:
      a volume update manager for acquiring from the storage system, either regularly or irregularly, information as to which logical volume has been updated at what time, and for registering the acquired information in a second information;
      an update management information acquisition unit for referencing first information denoting which logical volume is allocated to which application program and the second information, and acquiring update management information, which is information denoting which logical volume has been updated at what time, and to which application program this logical volume is allocated; and
      an update management information sending unit for sending acquired update management information to the host computer having the application program denoted in this update management information, and
   wherein the host computer comprising:
      a receiver for receiving the update management information from the management computer; and
      a host controller which, based on received update management information, is configured to display which logical volume has been updated at what time, and which application program is allocated to this logical volume, where said which logical volume and said which application program are displayed corresponding to each other on a displayed time axis.

2. The application management support system according to claim 1, wherein
   said management computer further comprises a failure detector for detecting a failure which occurs in said storage system,
   said update management information to be sent comprises a failure time, and
   said host controller displays the failure occurrence time contained in said update management information.

3. The application management support system according to claim 2, wherein
   said management computer further comprises a restore controller for sending to said storage system a restore request comprising logical volume identification information of said storage system and a RPO time,
   said update management information to be sent comprises said RPO time, and
   said host controller displays the RPO time contained in said update management information.

4. The application management support system according to claim 2, wherein
   a plurality of said host computers are provided,
   said update management information acquisition unit specifies an affected volume, which is a logical volume for which updating has taken place at a time comprising a failure occurrence time, by referencing said first information resource, specifies an affected application, which is the application program to which this logical volume is allocated, by referencing said second information, and acquires, as said update management information, information denoting which affected volume has been updated at what time, and to which affected application this affected volume is allocated, and
   said update management information sending unit sends said update management information to the host computer having said affected application of said plurality of host computers.

5. The application management support system according to claim 1, wherein
   each of said one or more application programs records the start time and end time of an operation related to generation of a write request in a log information resource, and
   said host controller displays what time updating has taken place in which logical volume, and which application program is allocated to this logical volume, and, based on said log information resource, displays which application program had been running in what period of time.

6. The application management support system according to claim 5, wherein
   said management computer further comprises a failure detector for detecting failure which occurs in said storage system,
   said update management information to be sent comprises a failure occurrence time, and
   said host controller displays the failure occurrence time contained in said update management information.

7. The application management support system according to claim 6, wherein
   said management computer further comprises a restore controller for sending to said storage system a restore request comprising logical volume identification information of said storage system and a RPO time,
   said update management information to be sent comprises said RPO time, and
   said host controller displays the RPO time contained in said update management information.

8. The application management support system according to claim 5, wherein
   a plurality of said host computers are provided; and
   said host controller conceals updating even when updating has taken place in a logical volume to which an application program is allocated at a time other than a period of time during which this application program had been running.

9. The application management support system according to claim 5, wherein
   a plurality of said host computers are provided; and
   said host controller is constituted so as to receive an RPO time specification, and to notify said management computer of the specified RPO time, and refuses a specification, which is a time other than a period of time during which an application program is running, and which makes a time in the time period during which updating took place in the logical volume to which this application program is allocated the RPO time.

10. The application management support system according to claim 5, wherein
    said host controller receives an RPO time specification via a GUI (Graphical User Interface); and
    a first display of what time updating has taken place in which logical volume, and which application program is allocated to this logical volume, and a second display of which application program had been running during what time period are lined up side-by-side in said GUI.

11. The application management support system according to claim 10, wherein
each of said first display and said second display is a graph or a table; and
a location equivalent to a certain time in said first display, and a location equivalent to this certain time in said second display, are lined up in said GUI perpendicularly or horizontally.

12. The application management support system according to claim 1, wherein
said host controller receives input of identification information for an application program to be targeted for management, registers the inputted application program identification information in a prescribed information resource, and notifies said management computer; and
said management computer further comprises an application identification information receiver for receiving application program identification information, and a first information resource updating unit for registering, in said first information resource, application program identification information, and identification information for the logical volume allocated to this application program.

13. The application management support system according to claim 1, wherein
said management computer further comprises a third information resource for denoting which logical volume belongs to which volume group;
said update management information comprises information denoting which logical volume belongs to which volume group; and
said host controller also displays which logical volume belongs to which volume group.

14. A management computer for managing a storage system having a plurality of logical volumes and a CDP (Continuous Data Protection) function for restoring data at an RPO (Recovery Point Objective) time inside a specified logical volume among the plurality of logical volumes, wherein application programs are configured to issue a write request specifying a logical volume among the plurality of logical volumes, the management computer, comprising:
a volume update manager for acquiring from the storage system, either regularly or irregularly, information as to which logical volume has been updated at what time and registering the acquired information in a second information;
an update management information acquisition unit for referencing first information denoting which logical volume is allocated to which application program and the second information, and acquiring update management information, which is information denoting which logical volume is updated at what time, and to which application program this logical volume is allocated, where the acquired updated management information is configured to effect display of said which logical volume and said which application program corresponding to each other on a displayed time axis; and
an update management information sending unit for sending acquired update management information to the host computer having the application program denoted in this update management information.

15. A host computer of a storage system having a CDP (Continuous Data Protection) function for restoring data at an RPO (Recovery Point Objective) time inside a specified logical volume, comprising:
one or more application programs, which issue a write request specifying a logical volume allocated from among a plurality of logical volumes in said storage system, and records the start time and end time of an operation related to generation of a write request in a log information resource;
a receiver for receiving from a management computer, which manages said storage system, update management information, which is information denoting which logical volume has been updated at what time, and to which application program this logical volume is allocated; and
a host controller which, based on the received update management information and said log information resource, is configured to display which logical volume has been updated at what time, and displaying which application program is allocated to this logical volume, and which application program had been running in which period of time, where said which logical volume and said which application program are displayed corresponding to each other on a displayed time axis.

16. An application management support method, comprising the steps of:
acquiring from a storage system, either regularly or irregularly, and registering which logical volumes have been updated at what time in a second information in said storage system, which has a CDP (Continuous Data Protection) function for restoring data at an RPO (Recovery Point Objective) time inside a specified logical volume;
referencing a first information denoting which logical volume is allocated to which application program, and said second information, and acquiring update management information, which is information denoting which logical volume has been updated at what time, and to which application program this logical volume is allocated; and
displaying, based on this update management information, which logical volume has been updated at what time, and which application program is allocated to this logical volume on a host computer for executing an application program, where said which logical volume and said which application program are displayed corresponding to each other on a displayed time axis.

17. The application management support system according to claim 5, wherein said host controller computes and displays a recommended RPO time based on said update management information and said log resource information.

* * * * *